UNITED STATES PATENT OFFICE.

CHARLES O. SCOTT, OF TORONTO, ONTARIO, CANADA, ASSIGNOR TO SCOTT MANUFACTURING COMPANY, OF TORONTO, ONTARIO, CANADA.

TALKING-MACHINE BRAKE.

1,256,601.  Specification of Letters Patent.  Patented Feb. 19, 1918.

Application filed July 12, 1917. Serial No. 180,125.

*To all whom it may concern:*

Be it known that I, CHARLES O. SCOTT, of the city of Toronto, in the county of York, in the Province of Ontario, in the Dominion of Canada, manufacturer, have invented certain new and useful Improvements in Talking-Machine Brakes, and do hereby declare that the following is a full, clear, and exact description of same.

This invention relates to talking machine brakes of the type adapted to control the starting and effect the automatic stopping of the rotation of a record carrying member of a talking machine, such for example as the type of brake referred to in my prior United States Letters Patent Number 1,203,418, granted to me on the 31st day of October, 1916; and has for its object to increase the applicability of such devices by providing for the variable adjustment of an operating lever with respect to the brake mechanism, or certain parts of the said brake mechanism, whereby the normal position on the machine of the said operating lever can be variably determined to suit the conditions under which the brake mechanism may be employed, with the result that the said brake mechanism may be applied to talking machines of various types and in various localities thereon, without requiring change in the design of the mechanism to suit the particular machine.

Further objects subsidiary to or resulting from the above mentioned main object or from the construction of the invention as it may be carried into effect will become apparent as the said invention is further disclosed hereinafter.

The invention may be carried into effect by the provision in combination with a brake releasing member, or members, adapted to automatically operate at a predetermined period in the operation of the talking machine, when a record is being reproduced, of a lever having for its purpose to effect the manual control directly or indirectly of the said releasing member as may be required to so determine the period in the operation of the machine at which the brake is to be applied, the said lever being normally operably associated with the said brake releasing member by virtue of suitable locking or connecting means, which locking or connecting means may be temporarily released to permit the independent movement and adjustment of the said operating lever, without affecting the position of the said releasing member; so that the relative positions of said member and lever one to another, may be varied when and as desired; all of which is more particularly described and ascertained in and by the following specification having reference to the accompanying drawing, by way of example, in which—

Figure 1, is a plan view of a disk talking machine, partly broken away, the turn table being also still further broken away to indicate part of the rim thereon in section, the application of this invention to the machine being illustrated.

Fig. 2, is a detail perspective view, partly broken away, illustrating the brake mechanism detached from the machine.

Fig. 3, illustrates the relative positions of the certain members of the said brake mechanism one above the other upon a common pivot, and Fig. 4, is a detail view illustrating a method of arranging the brake mechanism to operate upon the motor or such mechanism within the motor casing.

Similar characters of reference indicate similar parts in the several figures of the drawing and Figs. 2, 3 and 4 are drawn to a larger scale than Fig. 1 of the said drawing.

A indicates the motor casing of a disk talking machine, B being the turn-table, C, C the sound arm, and D the reproducer, provided with the needle E; F illustrating a disk record upon the said turn-table B. The nature and variety of these parts are well known and, therefore, do not call for further description herein.

In the example, the turn-table B is provided with a downwardly extending rim $b^1$, against which the brake acts to normally prevent rotation of the turn-table.

The brake mechanism illustrated is situated beneath the turn-table B and comprises base plate 1, secured to the motor casing and provided with a pivot 2, at its outer end, and a further pivot 3 at its inner end, the pivot 2 rotatably carrying a brake member 4, which member is provided with a rubber 5, suitably mounted thereon, a lug 6, and is peripherally notched at 7 and 8.

9 is a trip arm, capable of angular movement about the pivot 3, and provided with a laterally projecting brake releasing arm or extension 10, the extremity of which is adapted, by its relative position, to contact with the lug 6 upon the brake member 4, when the said trip arm 9 is moved theretoward to a sufficient extent, so that movement of the said trip arm 9 toward the pivot 2, to a desired extent, would result in the rotation of the said brake member 4 about its supporting pivot 2, and the resultant withdrawal of the rubber 5 from contact with the rim $b^1$ of the turn-table B.

11 is a pawl arm also mounted on the said pivot 3, the free or outer end of which pawl arm is held in contact with the notched periphery of the brake member 4 and engages with the notch 8, when the said brake is in its operative position but may be brought into engagement with notch 7 upon the rotation of the said brake member, as result of pressure of the releasing arm 10 against the lug 6, the movement of the pawl arm 11, to so engage the notch 7, being effected by a tensioned spring 12, connecting projections 13 and 14 upon the brake member 4 and the pawl arm 11 respectively, and against the action of which spring the brake member 4 is rotated by the releasing arm 10.

The trip arm 9 and pawl arm 11 are frictionally engaged, a friction washer 15 being shown on the drawing, so that the said arms 9 and 11 have a tendency to maintain their angular relation, which relation may be varied by overcoming such friction which is not necessarily very great.

The sound arm C carries a trip 16, the position of which varies in accordance with the position of the needle E upon the record so that, as the needle E moves toward the center of the record, as is usually the case with disk records, the trip 16 will move in the same direction. It will be seen that the brake mechanism is so located that the trip arm 9 extends across the path of the trip 16.

17 is an operating lever by which the said trip arm 9 may be manually adjusted, the outer end of the said lever suitably registering with the graduated plate 18, and this lever is rigidly connected with the trip arm 9. It, therefore, follows that the movement of the operating lever in one or another direction, around the pivot 3, will result in a corresponding movement of the said trip arm and the relation of the parts is such that, in the example illustrated in Fig. 1, where the operating lever 17 registers with the graduation 0 on the plate 18, the trip arm 9 assumes a position adapted to be engaged by the trip 16 at that period in its travel when the needle E is located on an inner groove indicated by the line $x^0$ as shown on the drawings; whereas, if the lever 17 registers with the graduation 10 on the said plate 18, then the position of the trip arm 9 would be such that contact between the trip 16 and the said arm would ensue when the needle E had only traveled inwardly as far as the groove indicated by the line $x^{10}$. Similarly the movement of the lever 17 until it registers with the asterisk at the outer end of plate 18, would effect the movement of the trip arm 9 in a direction, and to an extent, whereby the trip releasing arm 10 would contact with the lug 6 and rotate the brake member 4 until the pawl arm engages with the notch 7 on the periphery of the said brake member, and so lock the said brake member in its inoperative position, permitting the rotation of the turn-table.

It will be understood that when the turn-table is released in this way, and the brake mechanism is then adjusted, by the setting of the operating lever with respect to the graduated plate to determine the movement of contact between the trip and trip arm, the attaining by the needle of the position on the record indicated by the graduation of which said needle registers, will result in automatic operation of the trip arm which by virtue of its frictional engagement with the pawl arm 11, release the said pawl arm from the notch 7, thus permitting the automatic application of the brake.

Further description of the brake mechanism is considered unnecessary in view of the fact that the principle illustrated, by way of example, herein is substantially described in detail in my prior Letters Patent, hereinbefore referred to and any such description as has been afforded in this specification is for the purpose of illustrating the general operation of the device as shown in the drawing.

It is now proposed to make the operating lever 17 adjustable in position, with respect to the brake mechanism, and particularly with respect to the trip arm 9, so that the normal position of the operating lever 17 may be varied to suit the type of machine to which the device is applied, or to suit the position which will be most desirable and convenient to the operator; that is to say, for example, in some cases it may be preferable to have the operating lever at the right hand side of the machine, while in others it may be desirable at the left hand side of the machine.

This may be accomplished by making the operating lever 17 an independent member, preferably mounted upon the common pivot 3, and providing the trip arm 9 with an orificed or slotted quadrant $9^a$ through which extends a set pin or other locking device 19, so that the relaxing of the locking device 19 will permit the independent movement of the lever 17 to such a position as may be most convenient, after which the lever may be secured. Thus, its movement will effect the operation of the brake mechanism from that part of the machine in which it has been positioned.

Although the invention has been described with regard to brake mechanism operating upon the turn-table, it is obvious that it is applicable to mechanisms operating upon other parts of the machine, and Fig. 4 illustrates a brake member adapted to transmit motion through a rotary pivot 2 to such transmission elements 20 that may be desired to apply an arresting force to any part of the motor mechanism.

This invention may be developed within the scope of the following claims without departing from the essential features of the said invention and it is desired that this specification and drawing be read as being merely illustrative and not in a limiting sense, except as necessitated by the prior art.

What I claim as my invention is:

1. In a talking machine brake mechanism, an operating lever connected with the said mechanism, said lever being adapted to be temporarily released from such operative connection whereby the said lever may be independently moved to vary its normal and operative angular relation to the said mechanism, while the remaining parts of said mechanism are undisturbed, and means normally securing said lever against such independent movement.

2. In a talking machine brake mechanism having a trip arm, a hand lever operating said trip arm, said lever being capable of adjustment angularly with respect to said trip arm without disturbing the relation between the parts of the brake mechanism and said trip arm, and means whereby the said lever may be rendered operatively rigid with the said trip arm.

3. In a talking machine brake mechanism having a trip arm, a lever operating said trip arm, a common pivot upon which both said arm and said lever are mounted, and adjustable locking means securing said lever to said arm.

Signed at the city of Toronto, in the county of York, in the Province of Ontario, in the Dominion of Canada, this 7th day of July, 1917.

CHARLES O. SCOTT.